United States Patent
Adams

(10) Patent No.: US 6,312,051 B1
(45) Date of Patent: Nov. 6, 2001

(54) MOISTURE DISPERSING SEAT COVER FOR A WHEELCHAIR

(76) Inventor: Christina L. Adams, 3950 W. Durham Dr., Bartlesville, OK (US) 74006

( * ) Notice: Subject to any disclaimer, the term of this patent is extended or adjusted under 35 U.S.C. 154(b) by 0 days.

(21) Appl. No.: 09/413,553

(22) Filed: Dec. 14, 1999

(51) Int. Cl.$^7$ .................................................. A47C 31/00
(52) U.S. Cl. ............................. 297/228.11; 297/228.13; 297/DIG. 6
(58) Field of Search ................................ 297/219.1, 224, 297/228.13, 228.11, DIG. 6, DIG. 4

(56) References Cited

U.S. PATENT DOCUMENTS

| | | | |
|---|---|---|---|
| 3,916,447 | * 11/1975 | Thompson . | |
| 4,378,396 | * 3/1983 | Urai et al. . | |
| 5,121,938 | 6/1992 | Gross et al. | 280/304.1 |
| 5,275,463 | * 1/1994 | Rocha . | |
| 5,333,921 | 8/1994 | Dinsmoor, III | 297/219.1 |
| 5,476,308 | * 12/1995 | St. Germain . | |
| 5,618,082 | * 4/1997 | Jachmich . | |
| 5,620,229 | * 4/1997 | Ledford . | |
| 5,806,925 | 9/1998 | Hanley | 297/229 |
| 5,809,595 | 9/1998 | Stevens et al. | 5/653 |
| 5,957,528 | * 9/1999 | Campbell . | |

FOREIGN PATENT DOCUMENTS

1075296 * 1/1967 (GB) .

* cited by examiner

Primary Examiner—Milton Nelson, Jr.
(74) Attorney, Agent, or Firm—Frank J. Catalano

(57) ABSTRACT

A cover for a wheelchair seat is made from a cloth having a first ply of wicking material for drawing moisture that contacts the first ply away from an occupant of the wheelchair and a second ply of absorbent material for drawing moisture out of the first ply and dispersing the drawn moisture in the second ply. The first and second plies are permanently secured in laminar relationship to each other, preferably by a hem along their perimeter. The cloth is detachably mounted on the wheelchair seat, preferably either by an elastic band positioned within the hem, the band having a length in its unstretched state which is less than the length of the hem, or by a plurality of hook-and-loop fasteners fixed in spaced apart relationship to the cloth and extending outwardly from the hem to a plurality of mating hook-and-loop fasteners fixed to the cloth proximate the hem. The elastic band mount is specially preferred for use with removable wheelchair seat cushions. The hook-and-loop mount is specially preferred for use in covering permanent seat parts of the wheelchair such as the back support. A third ply of impermeable material for preventing moisture from passing from the second ply into contact with the wheelchair surface may be disposed against the opposite side of the second ply as the first ply with all the plies being secured in laminar relationship with each other by the hem.

20 Claims, 3 Drawing Sheets

MOISTURE DISPERSING SEAT COVER FOR A WHEELCHAIR

BACKGROUND OF THE INVENTION

This invention relates generally to wheelchairs and more particularly concerns accessories for improving wheelchair comfort.

Sitting in substantially the same position for extended periods of time often results, for anyone, in the absorption of perspiration by the portion of our garments which is pressed between our body and the seat. For wheelchair occupants, who sit for extended periods of time and/or expend significant energy in maneuvering the wheelchair, this problem is simply a fact of everyday life. The moisture absorbed by the garments continues in contact with both the skin and the wheelchair, causing skin irritation and disorders to the occupant and possible damage to the occupant's clothing and wheelchair. Spilled liquids present additional moisture problems since wheelchair confinement often makes prompt attention to such occurrences inconvenient or even impossible.

It is, therefore, an object of this invention to provide a wheelchair seat cover which improves the comfort of a wheelchair occupant. A further object of this invention is to provide a wheelchair seat cover which reduces skin irritation and disorders caused by extended exposure to moisture of any kind including perspiration. Yet another object of this invention to provide a wheelchair seat cover which reduces damage to the clothing of the wheelchair occupant by moisture. It is also an object of this invention is to provide a wheelchair seat cover which reduces damage to wheelchair upholstery by moisture. Still another object of this invention is to provide a wheelchair seat cover which minimizes moisture contact with the wheelchair occupant. An additional object of this invention is to provide a wheelchair seat cover which facilitates rapid permeation of moisture into isolation from the wheelchair occupant. A further object of this invention is to provide a wheelchair seat cover which absorbs moisture, including perspiration and spilled liquids. Another object of this invention is to provide a wheelchair seat cover which disperses absorbed moisture over a large surface area. Yet another object of this invention is to provide a wheelchair seat cover which is easily attached to and removed from the wheelchair seat. And another object of this invention is to provide a wheelchair seat cover which is washable.

SUMMARY OF THE INVENTION

In accordance with the invention, a cover for a wheelchair seat is made from a cloth having a first ply of wicking material and a second ply of absorbent material. The wicking material draws the moisture that contacts it away from the occupant of the wheelchair and the absorbent material draws the moisture out of the wicking material and disperses it across its volume. The first and second plies are permanently secured in laminar relationship to each other, preferably by a hem along their perimeter, to form the cloth. The cloth is detachably mounted on the wheelchair seat, preferably either by use of an elastic band or by use of hook-and-loop fasteners. In the former case, an elastic band extends within the hem. The band has a length in its unstretched state which is less than the length of the hem, thus securing the cloth to the portion of the wheelchair inserted into it. The elastic band mount is specially preferred for use with removable wheelchair seat cushions. In this embodiment, the hem defines a cloth surface area shaped to cover the seat cushion top wall, the seat cushion side walls and a perimeter portion of the seat cushion bottom wall and the length of the elastic band in its unstretched state is less than the length of the perimeter of the seat cushion bottom wall. In the latter case, the hook-and-loop fasteners are fixed in spaced apart relationship to the cloth and extend outwardly from the hem for connection to mating hook-and-loop fasteners also fixed to the cloth adjacent to the hem. The hook-and-loop mount is specially preferred for use in covering permanent seat parts of the wheelchair, such as the back support. In this embodiment, the hem defines a cloth surface area shaped to cover at least the selected portion of the wheelchair seat. A third ply of impermeable material may also be used to prevent moisture from passing from the absorbent material to the wheelchair. All three plies are secured in laminar relationship with each other by the hem, the absorbent material being between the wicking and impermeable materials.

BRIEF DESCRIPTION OF THE DRAWINGS

Other objects and advantages of the invention will become apparent upon reading the following detailed description and upon reference to the drawings in which.

While the invention will be described in connection with preferred embodiments, it will be understood that it is not intended to limit the invention to those embodiments. On the contrary, it is intended to cover all alternatives, modifications and equivalents as may be included within the spirit and scope of the invention as defined by the appended claims.

DETAILED DESCRIPTION OF THE INVENTION

Figure 1:
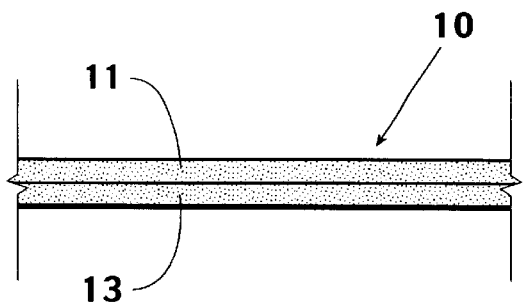
FIG. 1 is a cross-sectional view of a segment of two-ply cloth for use in a wheelchair seat cover.

Looking at FIG. 1, an exploded view of a piece of two-ply cloth 10 to be made into a cover for a wheelchair seat is illustrated. The two-ply cloth 10 consists of a first ply 11 of wicking material and a second ply 13 of absorbent material. The second ply 13 of absorbent material is positioned in laminar relationship with the first ply 11 of wicking material.

"Wicking" is used herein to describe a similar action as that of the operation of the wick of a candle, lamp or the like in that the material is a carrier which draws the intended liquid, such as melted tallow or wax or oil, from its source and delivers it to its useful destination. "Absorbent" is used herein to describe a similar action as that of a sponge which tends to soak up and disperse liquids throughout its volume. In the two-ply cloth presently described, the first ply 11 is intended to draw moisture away from the body and the apparel of the wheelchair occupant and to convey that moisture to the second ply 13 which accepts the transferred moisture and disperses it over a greater volume remote from the wheelchair occupant.

Figure 2:
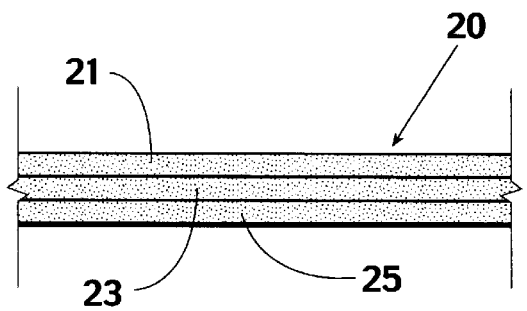
FIG. 2 is a cross-sectional view of a segment of three-ply cloth for use in a wheelchair seat cover.

Turning to FIG. 2, a three-ply cloth 20 is illustrated having first and second plys 21 and 23 of wicking and absorbing material, respectively, as hereinbefore discussed in relation to the two-ply cloth 10. However, a third ply 25 of impermeable material is positioned in laminar relationship on the opposite side of the second ply 23 of absorbing material as the first ply 21 of wicking material. The intended operation of the three ply cloth 20 is the same as above described in relation to the two-ply cloth 10, except that the third impermeable ply 25 prevents passage of moisture from the absorbent ply 23 to the wheelchair.

Synthetic fabrics perform well as the first or wicking ply 11 or 21. In particular, rayon, nylon/Lycra blend, nylon mesh, nylon and rayon/polyester blend were all found to be effective. In substantially identical tests, rayon provided the lowest humidity readings in the wheelchair, averaging 47.33 percent after thirty minutes. Polyester loft fabric or fleece was also found to be a good wicking material when under pressure, such as when being sat upon. Cotton was found to be a most effective second or absorbent ply 13 or 23. In particular, Aida cotton, Monk's cloth, cotton dobby weave, cotton knit, cotton pile and Bird's-eye weave were all found suitable for this purpose. In substantially identical tests, Aida cotton afforded the best dispersal of moisture by 23 percent.

Figure 3:
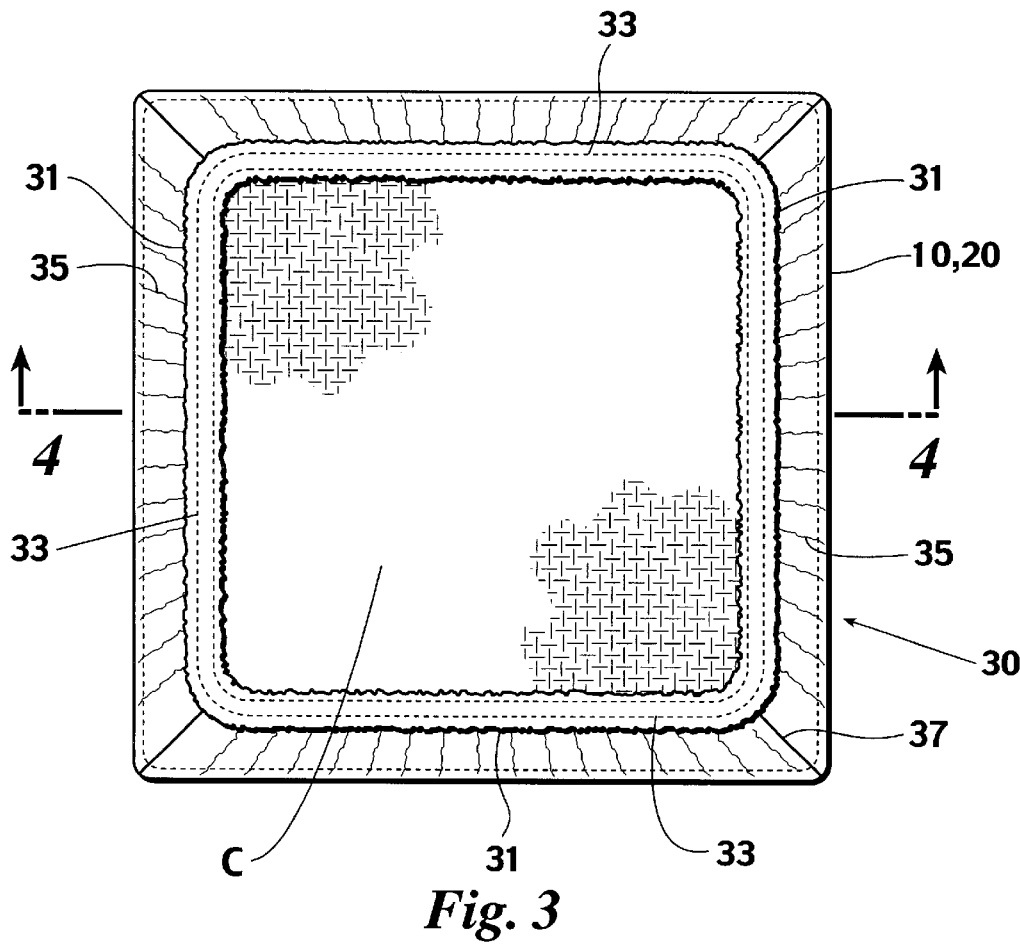
FIG. 3 is a bottom plan view of a preferred embodiment of a seat cover on the cushion of a wheelchair seat.
Figure 4:
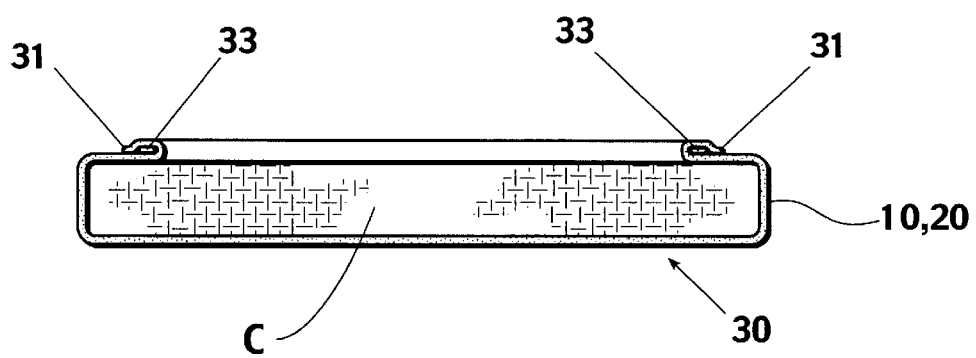
FIG. 4 is a cross-section taken along the line 4—4 of FIG. 3.

Turning to FIGS. 3 and 4, a preferred embodiment of a cover 30 for the removable cushion C of a wheelchair (not shown) is illustrated. The cover 30 can be made from either the two or three ply cloth 10 or 20 hereinbefore discussed. As shown in FIGS. 3 and 4, the plies of the cloth 10 or 20 are permanently secured in their laminar relationship by a hem 31 along their perimeter. The hem 31 defines a cloth 30 having a surface area shaped to cover the top face, side faces and only a portion of the bottom face of the cushion C. An elastic band 33 extends within the hem 31. The length of the elastic band 33 in its unstretched state is less than the perimeter of the cushion C. Thus, the cushion C is insertable through the hem 31 when the elastic band 33 is stretched. The cover 30 pulls in conformance to the top wall, side walls and portion of the bottom wall of the cushion C when the elastic band 33 is released to its unstretched condition. This results in the gathers 35 of material from the outer bottom edge of the cover 30 to the inside edge of the hem 31. As shown, the corners of the cover 30 are pleated 37 to facilitate conformation of the cover 30 to the cushion C.

Figure 6:
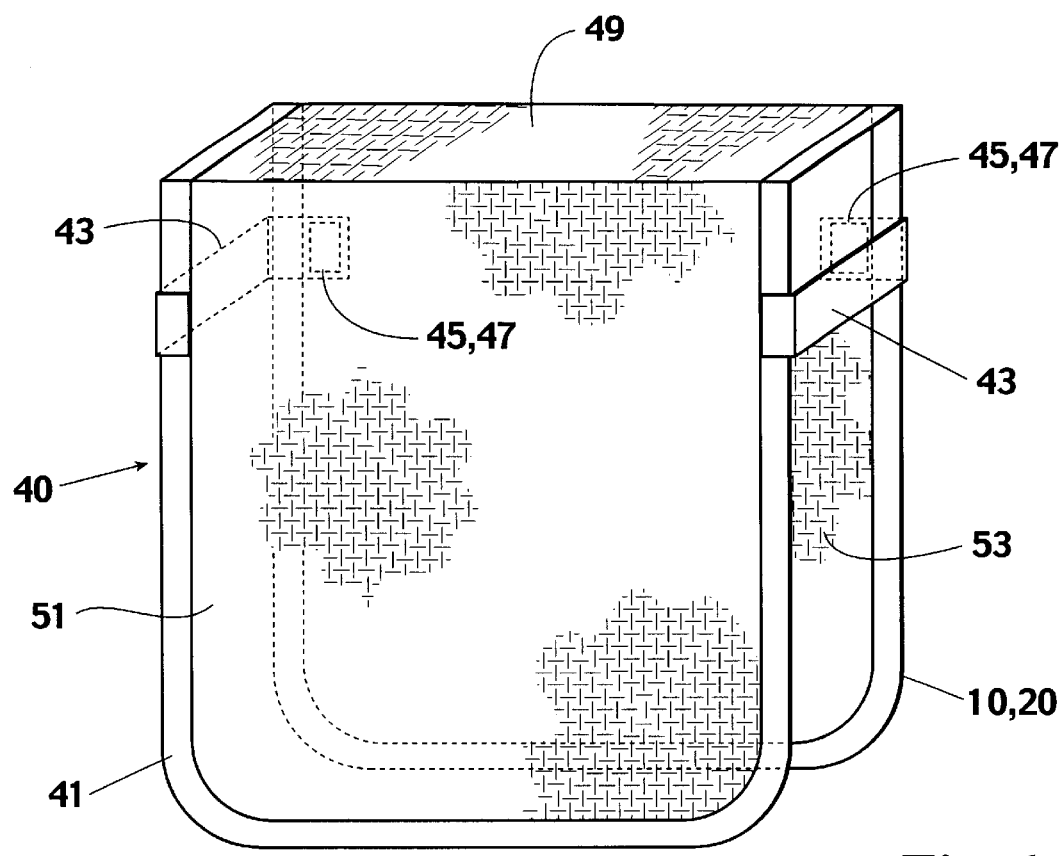
FIG. 6 is perspective view of the seat cover of FIG. 5.
Figure 5:
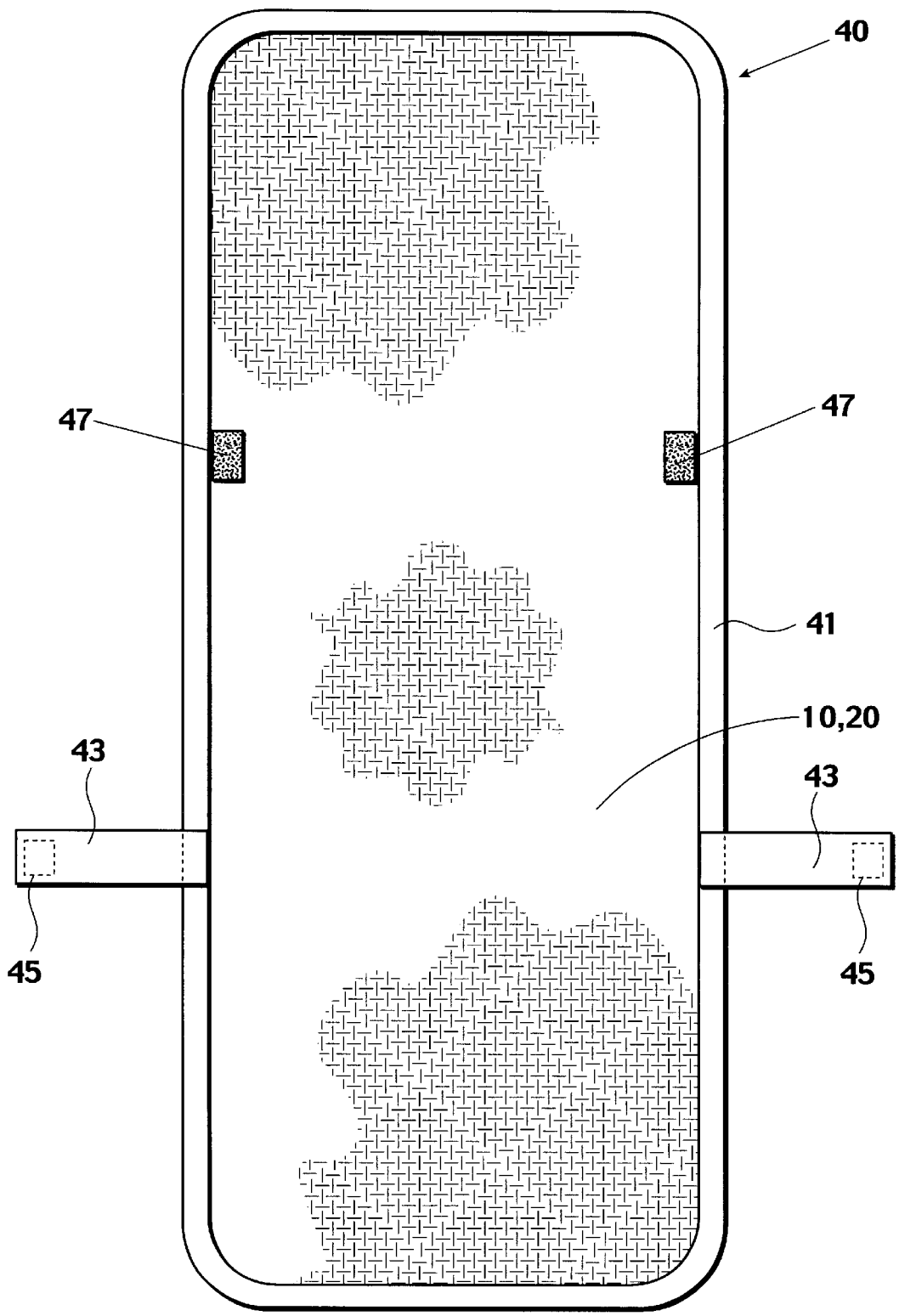
FIG. 5 is a bottom plan view of a preferred embodiment of a seat cover for the back support of a wheelchair seat.

Looking at FIGS. 5 and 6, a hook-and-loop embodiment of the wheelchair cover 40 is shown. As shown, the cover 40 can be made using either the two-ply or three-ply cloth 10 or 20 illustrated in FIGS. 1 and 2. The plies of the cloths 10 or 20 are permanently secured in laminar relationship to each other by a hem 41 stitched along the perimeter of the cloth 10 or 20. The hem 41 defines a cover 40 having a surface area shaped to cover a selected portion of the wheelchair seat (not shown). As shown in FIG. 5, a rectangular cover 40 has been hemmed to cover the back support of a wheelchair (not shown). As is best seen in FIG. 6, the cover 40 will be folded over the top of the back support. Straps 43 permanently stitched to the cover 40 at its hem 41 extend outwardly from the cover 40. Hook-and-loop fastening material 45 is stitched or otherwise fixed to the free ends of the straps 43. Mating hook-and-loop fasteners 47 are also stitched or otherwise fixed to the cover 40 proximate the hem 41. As shown in FIG. 6, when the cover 40 is folded over the top of the wheelchair back support, the central portion 49 of the cover 40 will rest on top of the back support and the ends 51 and 53 of the cover 40 will extend downwardly along the front and back of the wheelchair back support, respectively. The straps 43 and mating hook-and-loop fasteners 47 are positioned so that, with the cover 40 draped on the wheelchair back support as above described, the straps 43 can be extended around the opposite sides of the wheelchair back support and the hook-and-loop fasteners 45 and 47 can be mated to secure the cover 40 in place.

While the embodiments of the covers 30 and 40 are illustrated in relation to the removable seat cushion C and the back support of the chair, the elastic band or hook-and-loop embodiments may be used with respect to both removable portions of the wheelchair seat such as cushions and fixed portions of the seat such as arm rests and back supports. The cloth 10 or 20 need only be shaped, sized and pleated to conform to the area to be covered. Furthermore, while the elastic band and hook-and-loop embodiments are preferred, other fastening means such as buttons, zippers, straps or laces could also be adapted for the purpose.

Thus, it is apparent that there has been provided, in accordance with the invention, a wheelchair seat cover that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A cover for a wheelchair seat comprising:
   a cloth having a ply of wicking material for drawing moisture in contact therewith away from an occupant of the wheelchair, a ply of absorbent material for drawing moisture out of said wicking ply and dispersing the drawn moisture therein and means for permanently securing said wicking and absorbent plies in laminar relationship to each other; and
   means for detachably mounting said cloth on the wheelchair seat.

2. A cover according to claim 1, said permanently securing means comprising a hem along a perimeter of said cloth.

3. A cover according to claim 1, said cloth further comprising a ply of impermeable material for preventing moisture from passing from said absorbent ply to the wheelchair, said absorbent ply being disposed between said wicking and impermeable plies and said permanently securing means securing all said plies in laminar relationship with each other.

4. A cover according to claim 1, said detachably mounting means comprising a plurality of hook-and-loop fasteners fixed to and extending outwardly from a perimeter of said cloth and a plurality of mating hook-and-loop fasteners fixed to said perimeter.

5. A cover according to claim 1, said detachably mounting means comprising an elastic band positioned along a perimeter of said cloth, said band having a length in an unstretched state thereof less than a length of said perimeter.

6. A cover for a wheelchair seat comprising:
   a cloth having a ply of wicking material for drawing moisture in contact therewith away from an occupant of the wheelchair, a ply of absorbent material for drawing moisture out of said wicking ply and dispersing the drawn moisture therein, a ply of impermeable material for preventing moisture from passing from said absorbent ply to the wheelchair, said absorbent ply being disposed between said wicking and impermeable plies and a hem along a perimeter of said cloth for permanently securing said wicking, absorbent and impermeable plies in laminar relationship to each other; and
   means for detachably mounting said cloth on the wheelchair seat.

7. A cover for a wheelchair seat cushion comprising:

a cloth having a first ply of wicking material for drawing moisture in contact therewith away from an occupant of the wheelchair, a second ply of absorbent material for drawing moisture out of said first cloth and dispersing the drawn moisture therein and a hem permanently securing said first and second plies in laminar relationship to each other, said hem defining a surface area of said cloth shaped to cover the seat cushion top wall, the seat cushion side walls and a perimeter portion of the seat cushion bottom wall; and an elastic band within said hem having a length in an unstretched state less than a length of a perimeter of said cloth for detachably mounting said cloth on the wheelchair seat.

8. A cover according to claim 7, said cloth further comprising a third ply of impermeable material for preventing moisture from passing from said second ply to the wheelchair, said second ply being disposed between said first and third plies and said hem securing all said plies in laminar relationship with each other.

9. A cover for a portion of a wheelchair seat comprising:

a cloth having a first ply of wicking material for drawing moisture in contact therewith away from an occupant of the wheelchair, a second ply of absorbent material for drawing moisture out of said first ply and dispersing the drawn moisture therein and a hem permanently securing said first and second plies in laminar relationship to each other, said hem defining a surface area of said cloth shaped to cover the portion of the wheelchair seat; and a plurality of hook-and-loop fasteners fixed in spaced apart relationship to said cloth along and extending outwardly from said hem and a plurality of mating hook-and-loop fasteners fixed to said cloth proximate said hem for detachably mounting said cloth on the wheelchair seat.

10. A cover according to claim 9, said cloth further comprising a third ply of impermeable material for preventing moisture from passing from said second ply to the wheelchair, said second ply being disposed between said first and third plies and said hem securing all said plies in laminar relationship with each other.

11. A cover for a wheelchair seat comprising a cloth having a first ply of wicking material for drawing moisture in contact therewith away from an occupant of the wheelchair, a second ply of absorbent material for drawing moisture out of said first ply and dispersing the drawn moisture therein and means for permanently securing said first and second plies in laminar relationship to each other.

12. A cover according to claim 11, said cloth further comprising a third ply of impermeable material for preventing moisture from passing from said second ply to the wheelchair, said second ply being disposed between said first and third plies and said permanently securing means securing all said plies in laminar relationship with each other.

13. A cover according to claim 11, said first ply of wicking material being rayon.

14. A cover according to claim 11, said first ply of wicking material being nylon.

15. A cover according to claim 11, said first ply of wicking material being a polyester loft fabric.

16. A cover according to claim 11, said first ply of wicking material being a nylon/Lycra blend.

17. A cover according to claim 11, said first ply of wicking material being a rayon-polyester blend.

18. A cover according to claim 11, said second ply of absorbent material being linen.

19. A cover according to claim 11, said second ply of absorbent material being cotton.

20. A cover according to claim 11, said second ply of absorbent material being one of:

a. Aida cotton;

b. Monk's cloth;

c. Cotton dobby weave;

d. Cotton knit;

e. Cotton pile; and f. Cotton bird's-eye weave.

* * * * *